(12) United States Patent
Renggli et al.

(10) Patent No.: US 11,404,855 B2
(45) Date of Patent: Aug. 2, 2022

(54) METHOD OF CONNECTING A FIRST CABLE TO A SECOND CABLE, CABLE ARRANGEMENT, AND CABLE CONNECTION DEVICE FOR CONNECTING A FIRST CABLE TO A SECOND CABLE

(71) Applicant: KOMAX HOLDING AG, Dierikon (CH)

(72) Inventors: Urs Renggli, Hergiswil (CH); Thomas Bussmann, Lauerz (CH); René Lehn, Meggen (CH); Beat Theiler, Hochdorf (CH); Tilman Hoss, Thalwil (CH); Conradin Jost, Lucerne (CH)

(73) Assignee: KOMAX HOLDING AG, Dierikon (CH)

( * ) Notice: Subject to any disclaimer, the term of this patent is extended or adjusted under 35 U.S.C. 154(b) by 510 days.

(21) Appl. No.: 16/159,800

(22) Filed: Oct. 15, 2018

(65) Prior Publication Data
US 2019/0131780 A1    May 2, 2019

(30) Foreign Application Priority Data
Oct. 30, 2017    (EP) .................................... 17199229

(51) Int. Cl.
*H02G 1/14* (2006.01)
*H02G 3/30* (2006.01)
(Continued)

(52) U.S. Cl.
CPC .............. *H02G 1/14* (2013.01); *G09F 3/205* (2013.01); *H02G 3/266* (2013.01); *H02G 3/305* (2013.01); *B29C 65/5092* (2013.01)

(58) Field of Classification Search
CPC ....... B29C 65/5092; G09F 3/205; H02G 1/14; H02G 3/266; H02G 3/305
See application file for complete search history.

(56) References Cited

U.S. PATENT DOCUMENTS 4,636,279 A * 1/1987 Morgan ................. B65H 21/00
156/157
5,693,165 A * 12/1997 Schmitz ............ A61F 13/15764
156/163
(Continued)

FOREIGN PATENT DOCUMENTS

CN    102870171 A    1/2013
DE    3220533 A1    12/1983
(Continued)

*Primary Examiner* — Timothy J Thompson
*Assistant Examiner* — Rhadames Alonzo Miller
(74) *Attorney, Agent, or Firm* — William J. Clemens; Shumaker, Loop & Kendrick, LLP

(57) ABSTRACT

A method for connecting a first cable to a second cable with an adhesive tape to form a cable chain includes: arranging a free end region of the first cable parallel to and spaced from a first end region of the second cable; providing the adhesive tape folded in its longitudinal direction to form opening tabs at its first and opposite second ends with an adhesively coated side of the adhesive tape partially adhering to itself; and enclosing a part of the first cable free end region and a part of the second cable first end region with the adhesive tape such that the first cable free end region has a greater distance from the first adhesive tape end and the second adhesive tape end than the second cable first end region and is detachably connected to the second cable first end region.

20 Claims, 9 Drawing Sheets

(51) Int. Cl.
*H02G 3/00* (2006.01)
*G09F 3/20* (2006.01)
*B29C 65/50* (2006.01)

(56) References Cited

U.S. PATENT DOCUMENTS

| | | | | |
|---|---|---|---|---|
| 2002/0195765 | A1* | 12/2002 | Tunink | B65H 7/12 |
| | | | | 271/9.01 |
| 2003/0192639 | A1* | 10/2003 | Mitchell | B65C 9/36 |
| | | | | 156/250 |
| 2007/0209821 | A1* | 9/2007 | Otsuki | H02G 1/14 |
| | | | | 174/88 R |
| 2012/0061019 | A1* | 3/2012 | Kasahara | B65H 35/0066 |
| | | | | 156/269 |
| 2012/0298395 | A1 | 11/2012 | Gundel | |
| 2012/0330453 | A1* | 12/2012 | Samak Sangari | B25J 15/0085 |
| | | | | 700/121 |
| 2013/0341063 | A1* | 12/2013 | Gundel | H01B 11/18 |
| | | | | 174/103 |
| 2014/0299266 | A1* | 10/2014 | Borgmann | B29C 70/30 |
| | | | | 156/256 |
| 2018/0186492 | A1* | 7/2018 | Kronseder | B65C 9/2217 |

FOREIGN PATENT DOCUMENTS

| | | | | |
|---|---|---|---|---|
| DE | 3327583 | A1 | 2/1985 | |
| DE | 29721028 | U1 | 12/1998 | |
| DE | 10202454 | A1 | 7/2003 | |
| EP | 1367608 | A2 * | 12/2003 | B29C 63/065 |
| EP | 1744403 | A1 | 1/2007 | |
| JP | S52161281 | U | 12/1977 | |
| JP | S5615582 | A | 2/1981 | |
| JP | 2007-000196 | U * | 1/2007 | H02G 1/06 |
| JP | 3130546 | U | 3/2007 | |
| JP | 2011081279 | A | 4/2011 | |
| JP | 2013127866 | A | 6/2013 | |
| KR | 20080006208 | U | 6/2007 | |
| WO | 9821801 | A1 | 5/1998 | |

* cited by examiner

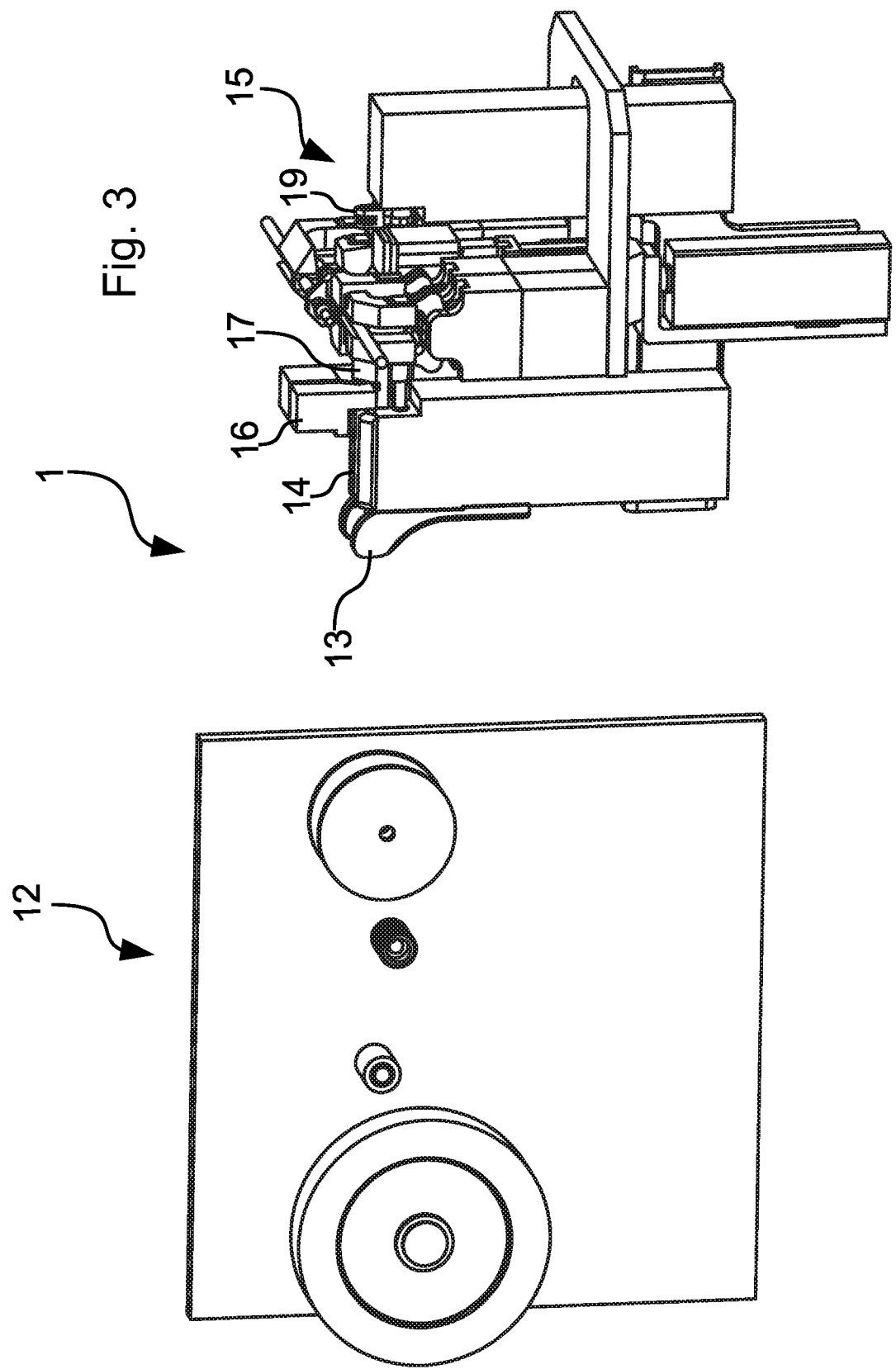

METHOD OF CONNECTING A FIRST CABLE TO A SECOND CABLE, CABLE ARRANGEMENT, AND CABLE CONNECTION DEVICE FOR CONNECTING A FIRST CABLE TO A SECOND CABLE

FIELD

The present invention relates to a method of connecting a first cable to a second cable, a cable arrangement, and a cable connection device for connecting a first cable to a second cable.

BACKGROUND

Cable chains, i.e., cables or cable parts detachably connected to one another, or methods for producing such a cable chain and devices for creating such a cable chain are known. The cable chain comprises a plurality of cables or cable elements, in each case one end or an end region of a cable is connected in chain fashion to the end or the end region of the next cable, etc. Cable chains are used, for example, in decentralized productions. In this case, complete cable sets or parts of cable sets are made, linked together and wound up on a drum. The prefabricated cable chains, for example, are rolled up on a drum to the mounting locations where they are installed. The cable chains are normally created in such a way that, when unwinding the individual cables, there is a logical sequence corresponding to the wiring diagram. The installer does not have to worry about the location or order of the individual cables when using such cable chains on site to install the cables since the order of the cables is already specified by the order of the cables in the cable chain (e.g., on the drum).

DE 29 721 028 U1 describes, for example, a cable chain which connects or interlinks the cables or cable ends by means of a piece of plastic tubing. Also known are linking elements made of plastic, which have a specific uptake geometry (see, for example, DE 3 220 533 A1 and DE 3 327 583 A1). In these cable chains, however, the linking element is usually reused after use, otherwise the cost is too high. In addition, the production of the connection between the cables is technically complicated, since in particular the alignment of the linking element to the cables or cable ends has to be carried out precisely. As a result, the complexity and cost of producing the cable chain are high.

There may be, among other things, a need for a method for connecting a first cable to a second cable or a cable arrangement or a cable connection device for connecting a first cable to a second cable, in which the two cables can be connected or are connected detachably to each other in a technically simple and inexpensive manner.

SUMMARY

According to a first aspect of the invention, a method for connecting a first cable to a second cable with an adhesive tape is proposed, comprising the following steps: Arranging a free end region of the first cable, which in particular is a cable at the end of a cable chain of a plurality of cables connected to each other, parallel to and spaced from a first end region of the second cable; Providing the adhesive tape, wherein the adhesive tape is folded in a longitudinal direction of the adhesive tape to form opening tabs at its first adhesive tape end and its second adhesive tape end opposite the first adhesive tape end such that an adhesively coated side of the adhesive tape partially adheres to itself; and Enclosing a part of the free end region of the first cable and a part of the first end region of the second cable with the adhesive tape such that the free end region of the first cable has a greater distance from the first adhesive tape end and the second adhesive tape end than the first end region of the second cable and is detachably connected to the first end region of the second cable.

An advantage of this method is typically that the cables are technically simple and inexpensively detachably connected to each other. Therefore, a cable chain can be formed with multiple cables usually technically simply and inexpensively, in which respectively a cable end or an end region of a cable is connected in chain fashion to the cable end or the end region of the next cable. Since the connecting element, i.e., the adhesive tape, is inexpensive, the connecting element usually does not have to be reused. This typically reduces costs and simplifies the method. In addition, the cables normally do not have to be aligned with high precision with respect to each other, so that the end regions of the cables can be connected by means of the adhesive tape. Due to the opening tabs, the cables can typically be separated from one another and from the adhesive tape in a technically simple manner, in particular without tools. Thus, in general, the cables can be quickly installed on site.

The second or second free end region of the first cable opposite the free end region can be connected to a drum or to further wound cables on a drum.

According to a second aspect of the invention, a cable arrangement is proposed, comprising—a free end region of a first cable,—a first end region of a second cable, wherein the second cable is aligned parallel to the first cable,—an adhesive tape, by means of which the free end region of the first cable spaced from the first end region of the second cable is detachably connected to the first end region of the second cable, wherein the adhesive tape is folded at its first adhesive tape end and its second adhesive tape end opposite the first adhesive tape end in a longitudinal direction of the adhesive tape so as to form opening tabs, such that an adhesively coated side of the adhesive tape partially detachably adheres to itself.

An advantage of this is that the cable arrangement is in general technically simple and inexpensive to produce. In addition, due to the opening tabs, the end regions of the cables or the cables can typically be separated quickly and technically simply, in particular without tools, from one another and from the adhesive tape. As a result, the cables can usually be installed quickly on site.

According to a third aspect of the invention, a cable connection device for connecting a first cable to a second cable by means of an adhesive tape is proposed, wherein the cable connection device has the following:—a cable holder for holding a free end region of the first cable spaced from and parallel to a first end region of the second cable,—an adhesive tape applicator for feeding the adhesive tape to an adhesive tape applicator head, wherein the adhesive tape is folded to form opening tabs at its first adhesive tape end and its second adhesive tape end opposite the first adhesive tape end in a longitudinal direction of the adhesive tape such that an adhesively coated side of the adhesive tape partially adheres to itself, and—the adhesive tape applicator for wrapping at least a part of the free end region of the first cable and at least a part of the first end region of the second cable with the adhesive tape and forming at least one contact region which is arranged between the free end region of the first cable and the first end region of the second cable and in which an adhesively coated side of the adhesive tape adheres to itself.

An advantage of this in general is that by means of the cable connection device, the cables can be connected to one another in a technically simple and inexpensive manner. Thus, typically by means of the cable connection device, a cable chain having a plurality of cables can be formed in a technically simple and inexpensive manner, in which respectively one cable end or one end region of a cable is connected in chain fashion to the cable end or the end region of the next cable. Since the connecting element, i.e., the adhesive tape, is inexpensive, the connecting element normally does not have to be reused. This typically reduces costs. Moreover, in the cable connection device, in general, the cables need not be aligned with each other with high precision so that the end regions of the cables can be connected by means of the adhesive tape. Due to the opening tabs produced by the cable connection device, the cables can usually be separated from one another and from the adhesive tape in a technically simple manner, in particular without tools. Thus, the cables can typically be quickly installed on site.

Possible features and advantages of embodiments of the invention may be considered, among other things, and without limiting the invention, as being based on the ideas and findings described below.

According to an embodiment of the method, the adhesive tape with its adhesively coated side is pressed together in at least two regions for forming two contact regions, in particular in three regions for forming three contact regions, wherein a first contact region of the contact regions is formed between the free end region of the first cable and the first end region of the second cable and a further contact region of the contact regions is formed on a side of the first end region of the second cable facing the first adhesive tape end and the second adhesive tape end of the adhesive tape. The advantage of this is that the cables are usually securely connected to each other. This typically increases the reliability of keeping the cables connected to each other during transportation. In particular, as a rule, the connection between the two cables remains secure even when pulling on a cable along its longitudinal direction. This is usually especially true when the diameters of the cables are different in size. Thus, typically a particularly reliable cable chain can be produced. Due to the separate wrapping of the two cables, i.e., there is (at least) one contact region between the cables in which the adhesive tape adheres to itself, an adhesive tape with a low holding force can generally be used. This usually reduces the risk of formation or retention of debris on the cables when the adhesive tape is detached from a cable or both cables. In addition, as a result, the connection of the cables can in general be released particularly easily in this way.

According to an embodiment of the method, a first contact region and a second contact region of the three contact regions are formed between the free end region of the first cable and the first end region of the second cable, wherein the first contact region is closer to the free end region of the first cable than the second contact region, and a third contact region of the three contact regions formed on a side of the first end region of the second cable facing the first adhesive tape end and the second adhesive tape end of the adhesive tape. This generally still further increases the reliability and mechanical strength of the connection between the first cable and the second cable. In addition, this typically determines the position or the distance of the second cable relative to the first cable in a technically simple manner.

According to an embodiment of the method, an adhesive tape applicator head is moved by pressing the adhesive tape together—in the first contact region in the direction of the first cable and/or—moved in the second contact region in the direction of the second cable and/or—moved in the third contact region in the direction of the second cable. As a result, normally, a free region or free regions in which the side of the adhesive tape does not adhere to itself with an adhesive layer is/are reduced. As a result, the adhesive tape typically adheres to itself over a particularly large area. Thus, in general, the two cables are held particularly securely in their respective position and connected to each other by the adhesive tape.

According to an embodiment of the method, the first contact region is formed first, in particular the contact regions are formed in the following order: first the first contact region, then the second contact region and finally the third contact region. As a result, the method can usually be carried out even faster since the total length of the movement or travel paths is particularly short. In addition, the distance of the second cable from the first cable is usually determined very certainly.

According to an embodiment of the method, the first contact region is formed first, in particular the contact regions are formed in the following order: first the first contact region, then the third contact region and finally the second contact region. An advantage of this is that typically the position of the second cable relative to the first cable is determined with certainty. In addition, normally, a pressing out of the second cable from the adhesive tape shuttle is reliably prevented by this order.

According to an embodiment of the method, a second end region of the second cable opposite the first end region of the second cable is connected by means of adhesive tape to a first end region of a third cable to form a cable chain. As a result, a cable chain with at least three cables is usually formed technically simply and inexpensively.

According to an embodiment of the method, when wrapping a part of the free end region of the first cable and a part of the first end region of the second cable with the adhesive tape, the first cable is arranged offset to the second cable along a longitudinal direction of the first cable, in particular by at least about 50% of a length of the first cable in the longitudinal direction. As a result, a chain or series of cables connected to each other can usually be formed technically simply, which can be rolled up on a drum or the like. The longitudinal direction may in particular be the direction in which the cable has the greatest extent.

According to an embodiment of the cable arrangement, the adhesively coated side of the adhesive tape partially adheres to itself between the free end region of the first cable and the first end region of the second cable. As a result, a particularly secure connection between cables is usually present. This is usually especially true when the diameters of the cables are different in size. Thus, typically a particularly reliable cable chain can be produced. Due to the separate wrapping of the two cables, i.e., there is (at least) one contact region between the cables in which the adhesive tape adheres to itself, an adhesive tape with a low holding force can generally be used in the cable arrangement. This usually reduces the risk of formation or retention of debris on the cables when the adhesive tape is detached from a cable or both cables. In addition, this can particularly easily release the connection of the cable in the cable arrangement.

According to an embodiment of the cable arrangement, the first cable is arranged offset relative to the second cable along a longitudinal direction of the first cable, in particular by at least approximately 50% of a length of the first cable in the longitudinal direction. The series or chain of cables of the cable arrangement can usually be easily rolled up on a drum and rolled back on site again or when needed. This usually facilitates transport or logistics. The longitudinal direction may in particular be the direction in which the cable has the greatest extent.

According to an embodiment of the cable connection device, the adhesive tape applicator has two parallel gripper jaws for compressing the adhesive tape in the contact regions. One advantage of this is that, in general, the contact regions in which the adhesively coated side of the adhesive tape adheres to itself are technically simple and reliable to produce.

According to one embodiment of the cable connection device, the adhesive tape applicator is configured to be movable in the longitudinal direction of the adhesive tape. As a result, the adhesive tape can typically be moved to the cables in a particularly simple manner together with the adhesive tape applicator. Thus, the cable connection device is normally configured technically even simpler.

According to an embodiment of the cable connection device, the adhesive tape applicator comprises a suction device for sucking the first adhesive tape end and/or the second adhesive tape end. This typically ensures that the adhesive tape end or adhesive tape ends remain arranged on the adhesive tape applicator until the adhesive tape has been securely connected or has adhered to the cables. This usually increases the reliability of the connection process of the two cables.

According to an embodiment of the cable connection device, the parallel gripper jaws each have a friction-increasing coating, in particular a friction-increasing elastomer layer. One advantage of this is that slippage of the adhesive tape ends from the adhesive tape applicator is typically certainly prevented. This usually increases the reliability of the connection process of the two cables. In addition, this typically better compensates for inaccuracies in the positioning of the two cables. In addition, the adhesive tape can generally be pulled into position slightly, if it already adheres to the upper cable before the first contact region has been processed.

According to an embodiment of the cable connection device, the parallel gripper jaws each have a friction-reducing layer, in particular a polytetrafluoroethylene layer. The advantage of this is that the parallel gripper jaws typically slide better over the adhesive tape, as a result of which the adhesive tape is pressed particularly well against the cables.

According to an embodiment, the cable connection device further comprises a folding gripper for gripping an adhesive tape end and folding the adhesive tape end along a longitudinal axis of the adhesive tape to produce an opening tab. As a result, it is normally technically easy to fold the adhesive tape end into an opening tab.

According to an embodiment, the cable connection device further comprises a cutting gripper for holding the adhesive tape and for cutting through the adhesive tape. As a result, it is usually technically easy to transport and cut off the adhesive tape.

According to an embodiment, the cable connection device is configured such that the first cable and the second cable are held with the adhesive tape in the wrapping of at least a part of the free end region of the first cable and at least a part of the first end region of the second table, such that the first cable is arranged offset to the second cable along a longitudinal direction of the first cable, in particular by at least about 50% of a length of the first cable in the longitudinal direction. As a result, a chain or series of cables connected to each other can usually be formed technically simply, which can be rolled up on a drum or the like. The longitudinal direction may in particular be the direction in which the cable has the greatest extent.

It should be understood that some of the possible features and advantages of the invention are described herein with reference to different embodiments. A person skilled in the art will recognize that the features can be suitably combined, adapted or replaced in order to arrive at further embodiments of the invention.

Embodiments of the invention will now be described with reference to the accompanying drawings, wherein neither the drawings nor the description are to be construed as limiting the invention.

DESCRIPTION OF THE DRAWINGS

FIG. 3 shows a perspective view of a cable connection device according to an embodiment of the present invention;

The figures are only schematic and not to scale. Like reference numerals designate like or equivalent features throughout the several figures.

DETAILED DESCRIPTION

Figure 1A:
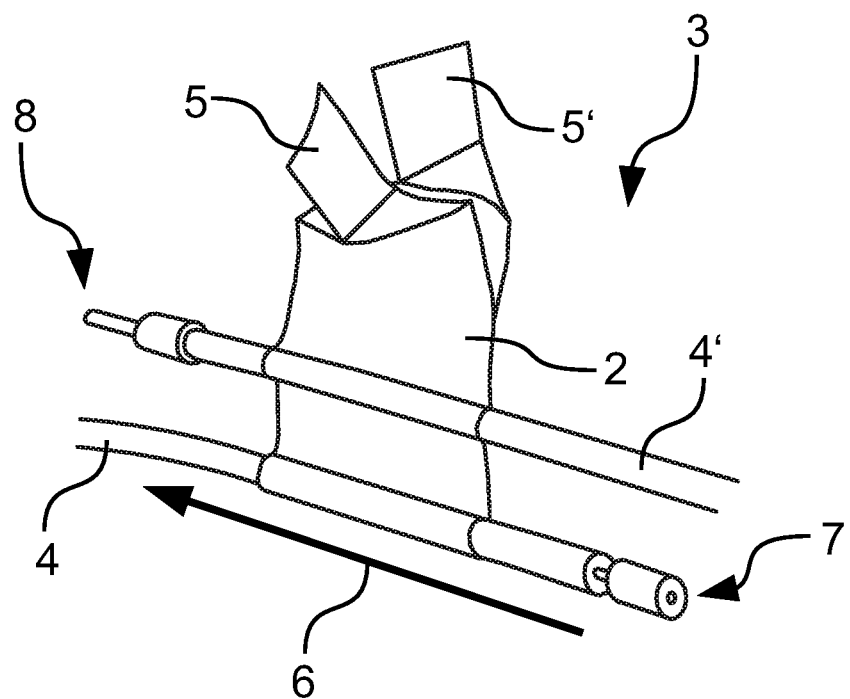
FIG. 1a shows a perspective view of a cable arrangement according to a first embodiment of the present invention.
Figure 1B:
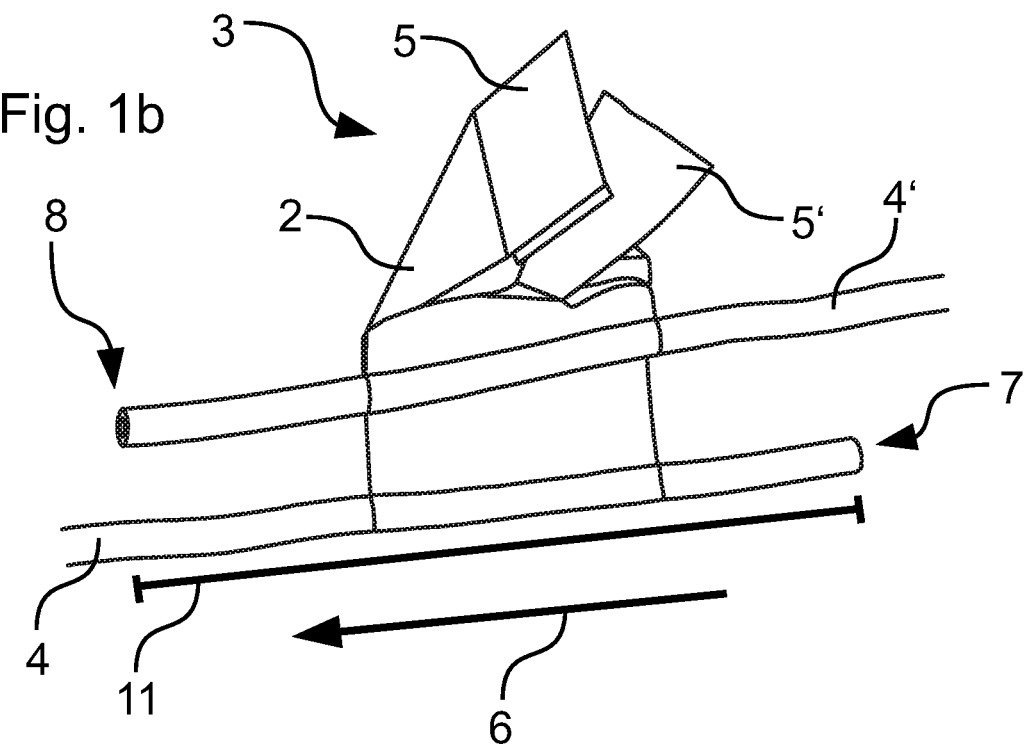
FIG. 1b shows a perspective view of a cable arrangement according to a second embodiment of the present invention.

FIG. 1a shows a perspective view of a cable arrangement 3 according to a first embodiment of the present invention. FIG. 1b shows a perspective view of a cable arrangement 3 according to a second embodiment of the present invention. The embodiment of the cable arrangement 3 shown in FIG. 1a differs from the embodiment of the cable arrangement 3 shown in FIG. 1b only in that the end regions 4, 4' of the two cables are configured differently, while in FIG. 1b, the end areas 4, 4' of the cable are configured the same. In FIG. 1a, the end regions 4, 4' have a crimped cable end sleeve or a stripped region with partial stripping. In FIG. 1b, the end regions 4, 4' and the cable ends have simply been cut to length. In the following, FIGS. 1a and 1b are explained together or the following explanations relate to FIGS. 1a and 1b, respectively, unless otherwise indicated.

The cable arrangement 3 comprises a first cable (in FIG. 1a and in FIG. 1b below) and a second cable (in FIG. 1a and in FIG. 1b above). The first cable has a free end region 4 which is connected to a first end region 4' of the second cable, wherein the second end or the second end region of the first cable opposite the free end region 4 can be connected with the drum or with further coiled cables on the drum. The first cable is arranged at least for the length of the overlap region 11 parallel to the second cable. The free end region 4 of the first cable and the first end region 4' of the second cable or the two ends 7, 8 of the cables point in directions opposite each other. The free end region 4 of the first cable and the first end region 4' of the second cable are arranged spaced from one another (perpendicular to their longitudinal extent, which extends in each case along the linking direction in FIG. 1a and in FIG. 1b). The two cables are spaced apart from each other and overlap in this position (viewed from above in FIG. 1a or 1 b, respectively) only for the length of the overlapping region 11.

The two cables can be part of a cable chain of a plurality of cables (e.g., ten, fifty or one hundred) in which two cables with their end regions 4, 4' are respectively connected in parallel. In this way, a cable chain is formed, which can be wound, for example, on a drum. The cables can be connected to each other according to an interconnection, e.g., a control cabinet.

The cable chain can be used, for example, in decentralized productions. In this case, complete cable sets or parts of cable sets are manufactured, linked to one another and wound up on a drum. The prefabricated cable chains are delivered to the assembly locations where they are installed. The cable chains are normally created in such a way that, when unwinding the individual cables, there is a logical sequence corresponding to the wiring diagram. The installer does not have to worry about arranging the individual cables when using such cable chains on site to install the cables since the order of the cables is already dictated by the sequence of cables on the drum or in the cable chain.

The two cables are detachably connected to each other by means of an adhesive tape 2. The adhesive tape 2 has opening tabs 5, 5' on a first adhesive tape end and on a second adhesive tape end opposite the first adhesive tape end (along the longitudinal direction of the adhesive tape). The opening tabs 5, 5' are formed, in which the adhesive tape 2, which (at least, in particular exactly) is provided on one side with an adhesive layer, adheres to itself on the two adhesive tapes ends. In this case, the adhesive side of the first adhesive tape end adheres in itself and the adhesive side of the second adhesive tape end also adheres in itself. The opening tabs 5, 5' are used to release the adhesive tape 2 from the cables and thus to release the connection between the two cables.

The first cable has a greater distance to the adhesive tape ends than the second cable. The two adhesive tape ends are located on one side of the second cable or of the first end region 4' of the second cable, which faces away from the first cable or the free end region 4 of the first cable. The first adhesive tape end adheres to itself and does not adhere to the second adhesive tape end. The second adhesive tape end adheres to itself and does not adhere to the first adhesive tape end.

The adhesive tape 2 almost completely surrounds the first cable. The first cable is located approximately in the middle of the longitudinal extent of the adhesive tape 2, wherein the longitudinal extent of the adhesive tape 2 in FIG. 1a or 1b extends substantially from top to bottom and then back up.

The linking direction 6 is indicated in FIG. 1a and FIG. 1b by an arrow. This means that the cables connected to each other are transported further in this direction. The second end region of the first cable, which is opposite the free end region of the first cable in the longitudinal direction of the first cable, is connected to a drum or to further coiled cables on the drum (not shown). The second end region of the second cable which is opposite the first end region 4' of the second cable, and not shown in the drawings, is not yet connected to a further cable. At this point, then a further cable can be connected to the second cable and in this way the cable chain can be further formed, which is pulled in the linking direction 6 and wound up, for example, on a drum.

The adhesive tape 2 wraps around or encloses a partial region of the free end region 4 of the first cable and the first end region 4' of the second cable. The adhesive tape 2 or the partial region of the free end region 4 of the first cable enclosed by the adhesive tape 2 and the first end region 4' of the second cable are each spaced from the end 7, 8 of the cable. However, it is also conceivable that the adhesive tape 2 is attached to the cables in such a way and vice versa, that the adhesive tape 2 is not arranged spaced from the respective end 7, 8 of the cable.

The adhesive tape 2 adheres together in such a way that the edges of the adhesive tape 2 extend substantially parallel to one another or flush to the region of the opening tabs 5, 5'. The one part of the adhesive tape 2 (e.g., the front region of the adhesive tape 2) does not protrude laterally beyond the other part of the adhesive tape 2 (e.g., the rear region of the adhesive tape 2) (outside the opening tabs 5, 5'). This also applies the other way around.

Figure 2:
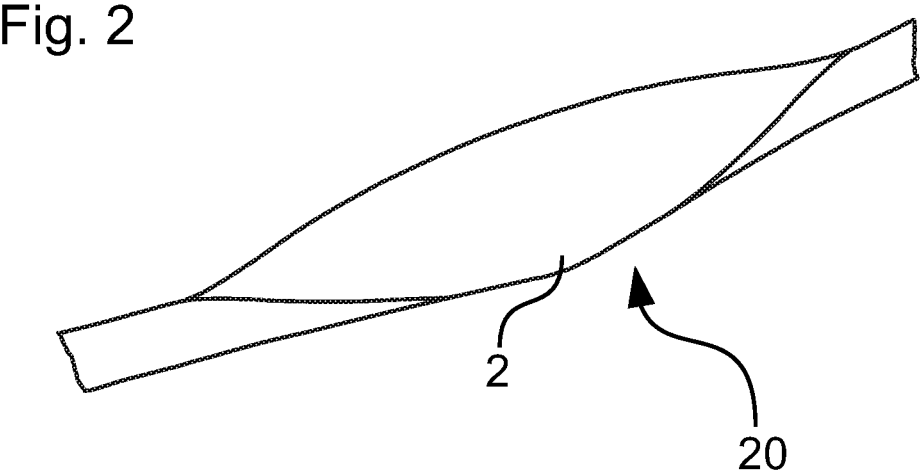
FIG. 2 shows a perspective view of one embodiment of an adhesive tape shuttle which may be used in the method according to the invention.

FIG. 2 shows a perspective view of one embodiment of an adhesive tape shuttle 20 which may be used in the method according to the invention. The adhesive tape shuttle 20 is formed from the initially flat adhesive tape 2 in which the adhesive side of the first adhesive tape end adheres in itself and the adhesive side of the second adhesive tape end adheres in itself. In the center of the adhesive tape 2, the adhesive tape 2 extends flatter than at the adhesive tape ends, which extend substantially perpendicular to the center of the adhesive tape 2.

The first (left) adhesive tape end in FIG. 2 and the second (right) adhesive tape end in FIG. 2 form the (later) opening tabs 5, 5' of the cable arrangement 3.

FIG. 3 shows a perspective view of a cable connection device 1 according to an embodiment of the present invention. The cable connection device 1 has a feeding device 12 and an adhesive tape applicator 15. The feeding device 12 has a plurality of rollers, via which an adhesive tape strip is fed from an adhesive tape supply roll to the adhesive tape applicator 15.

FIGS. 4a-4f show side views of the cable connection device 1 of FIG. 3 during the course of a method of connecting a first cable to a second cable according to an embodiment of the present invention. The adhesive tape applicator 15 is linearly movable from left to right or vice versa relative to the feeding device 12 and relative to the dual cable grippers 9, 10 which grip and hold the cables.

In FIG. 4 a, the adhesive tape 2 has already been fed by the feeding device 12 to the adhesive tape applicator 15. The adhesive tape applicator 15 comprises a web guide 13 into which the adhesive tape 2 is guided by the feeding device 12. Through the web guide 13, the adhesive tape 2 passes into the guide trough 14 in which the adhesive tape 2 or the adhesive tape strip is guided.

Figure 4A:
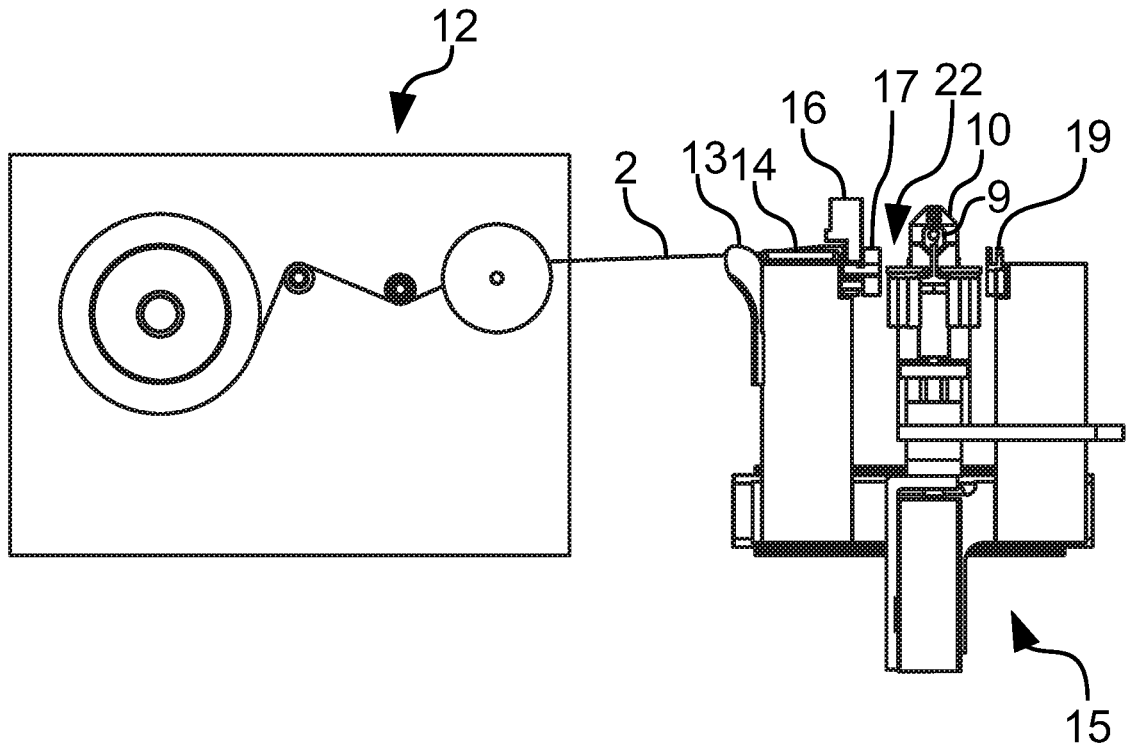
FIGS. 4a-4f show side views of the cable connection device of FIG. 3 during the course of a method of connecting a first cable to a second cable according to an embodiment of the present invention.

Further to the right of the guide trough 14 in FIG. 4a is the cutting gripper 16 for cutting the adhesive tape strip into a single adhesive tape 2, respectively in a single adhesive tape shuttle 20. The folding gripper 17 is arranged further to the right of the cutting gripper 16 in FIG. 4a. The folding gripper 17 folds the adhesive tape 2 or the adhesive tape strip along the longitudinal direction of the adhesive tape 2 or of the adhesive tape strip (which extends from left to right in FIGS. 4a-4f) such that the side of the adhesive tape 2 coated with an adhesive layer partially adheres in itself.

The adhesive tape applicator head 22 is arranged further to the right of the folding gripper 17. This head is vertically linearly movable, i.e., from bottom to top or vice versa. The adhesive tape 2 is attached to the two cables by means of the adhesive tape applicator head 22.

In addition, the cable connection device 1 comprises a cable holder, in the form of an upper double cable gripper 10 and a lower double cable gripper 9. The double cable grippers 9, 10 respectively engage the free end region 4 of the first cable or the first end region 4' of the second cable. The double cable grippers 9, 10 keep the free end region 4 of the first cable spaced from the first end region 4' of the second cable. The lower double cable gripper 9 comprises two grippers for gripping and holding the first cable. The upper double cable gripper 10 comprises two grippers for gripping and holding the second cable.

A holding gripper 19 is part of the adhesive tape applicator 15. The adhesive tape applicator 15 moves to the right and left in FIGS. 4a-4f. The adhesive tape applicator head 22 moves from below to above (high and below) in FIGS. 4a-4f. The holding gripper 19 holds a first adhesive tape end 2 of the adhesive tape. The cutting gripper 16 is arranged stationary opposite the double cable grippers 9, 10.

The adhesive tape 2 is kept ready, wherein the adhesive tape 2 is folded at a first adhesive tape end along the longitudinal direction of the adhesive tape 2 to produce the first opening tab 5, 5'. The fixed cutting gripper 16 holds ready the adhesive tape 2 folded at its first adhesive tape end. The guide trough 14 ensures that the adhesive tape 2 is prepared in a U-shape for the folding gripper 17.

Figure 4B:
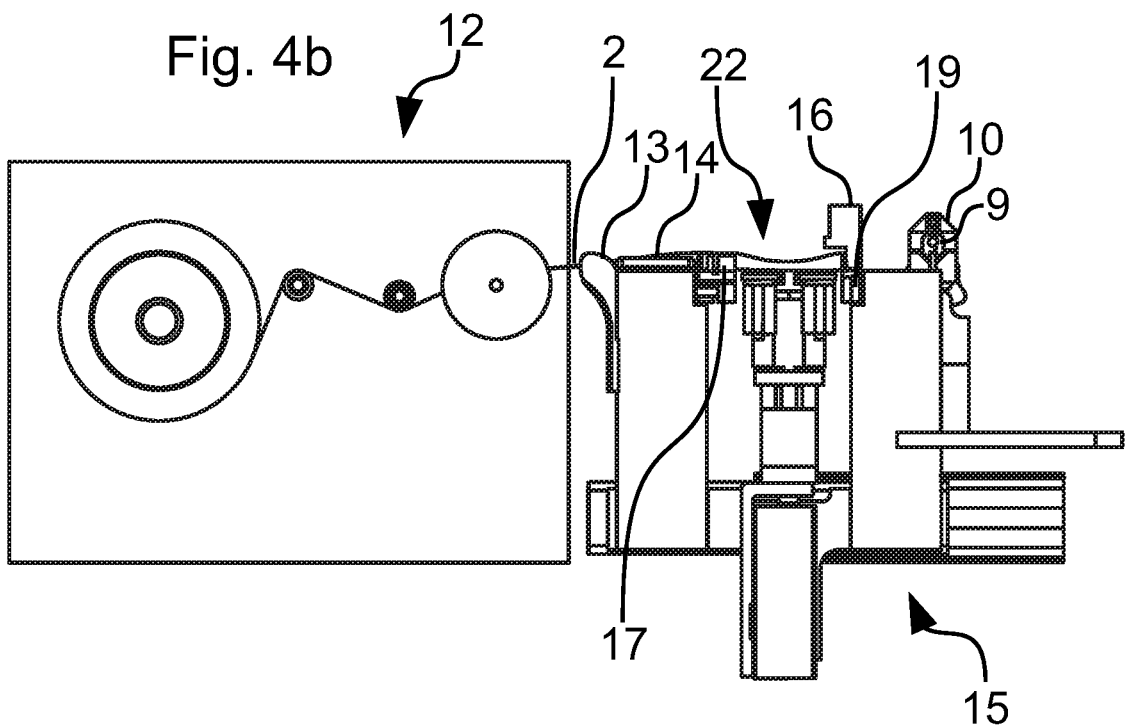

The adhesive tape applicator 15 moves toward the adhesive tape strip or in the direction of the feeding device 12 into the receiving position. The receiving position is shown in FIG. 4b. In this case, the web guide 13 and the guide trough 14 are pushed along the adhesive tape strip. The holding gripper 19 takes over the preformed opening tab 5, 5' of the adhesive tape 2 from the cutting gripper 16. The folding gripper 17 folds the adhesive tape 2 over a length which is twice as long as the length of the adhesive tape end required for an opening tab 5, 5' of the adhesive tape shuttle 20. One half of the folded part of the adhesive tape 2 is provided for the second adhesive tape end of the current adhesive tape shuttle 20. The other half of the folded part of the adhesive tape 2 is provided for the first adhesive tape end of the next adhesive tape shuttle 20.

Figure 4C:
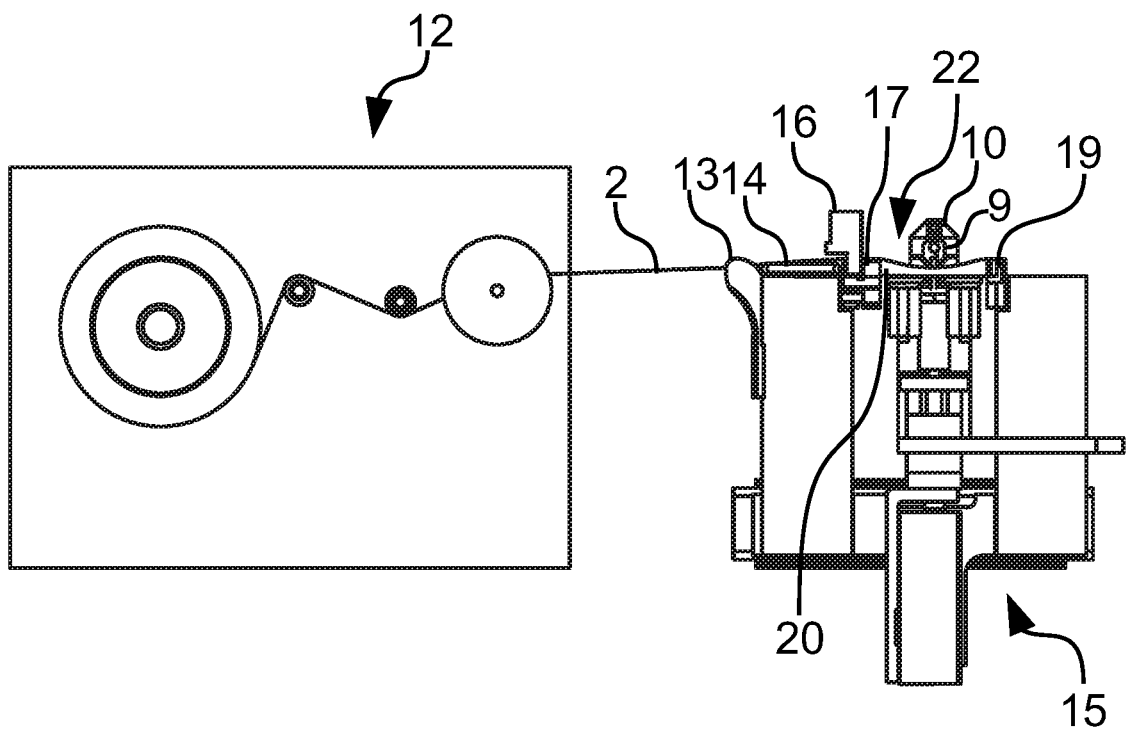

The adhesive tape applicator 15 moves to the applicator position with the first adhesive tape end restrained. The applicator position is shown in FIG. 4c. During the movement, the adhesive tape strip is unrolled from the adhesive tape roll. When the adhesive tape applicator 15 is located in the applicator position, the cutting gripper 16 separates the adhesive tape 2 folded at its two adhesive tape ends in the middle of the fold at the second adhesive tape end, thereby separating the adhesive tape shuttle 20 and the adhesive tape 2 from the remainder of the adhesive tape strip. The cutting gripper 16 holds the second adhesive tape end firmly. The cutting gripper 16, the holding gripper 19 and the folding gripper 17 are configured such that they can take over the adhesive tape 2, i.e., the holding gripper 19 can take over the adhesive tape 2 or the first adhesive tape end from the cutting gripper 16 and the cutting gripper 16 can take over the second adhesive tape end from the folding gripper 17. For this purpose, the cutting gripper 16, the holding gripper 19 and the folding gripper 17 each have recesses in their gripper jaws.

The folding gripper 17 and the holding gripper 19 are unloaded in the applicator position. Then they serve as a guide of the adhesive tape shuttle 20. The adhesive tape applicator head 22 then moves up to the first cable (the lower cable) in FIG. 4d.

The adhesive tape shuttle 20 located on the adhesive tape applicator head 22 is thereby pressed flat approximately or exactly in its center by the first cable and folded in (upward). The adhesive tape applicator head 22 moves to the first (lowest) main point 23 (FIG. 5), which is located immediately above the first cable. Here, the parallel gripper jaws 29, 29' compress the adhesive tape shuttle 20 folded in its middle of the longitudinal extent and, in the closed position in which the adhesive tape 2 is compressed, travel downwards in the direction of the first cable. The distance traveled by the first main point 23 may be about 0.5 mm. As a result, a free region 26, 26', 26" (FIG. 6), which is directly adjacent to the respective cable and in which the adhesive tape 2 does not adhere to itself, is reduced. It is thus ensured that the adhesive tape 2 has sufficient contact with the circumference of the lower cable and position inaccuracies are corrected, which would result in a large free region 26. The adhesive tape 2 is compressed in a first contact region 28 by the parallel gripper jaws 29, 29'.

The parallel gripper jaws 29, 29', after moving in the direction of the first cable in closed positions in order to compress the adhesive tape 2 in the first contact region 28, are now opened so that the adhesive tape applicator head 22 approaches or can approach the middle, second main point 24. The second main point 24 is located immediately below the lower end of the circumference of the second cable. After moving the parallel gripper jaws 29, 29' to the second main point 24, they are closed and the adhesive tape 2 thereby compressed, in a second contact region 28', which overlaps with the first contact region 28. The parallel gripper jaws 29, 29' move in the closed position, in which the adhesive tape 2 is compressed, upwards in the direction of the second cable. The distance traveled by the second main point 24 may be about 0.5 mm. The parallel gripper jaws 29, 29' are in turn opened, so that the adhesive tape applicator head 22 approaches or can approach the upper, third main point 25.

Figure 4D:
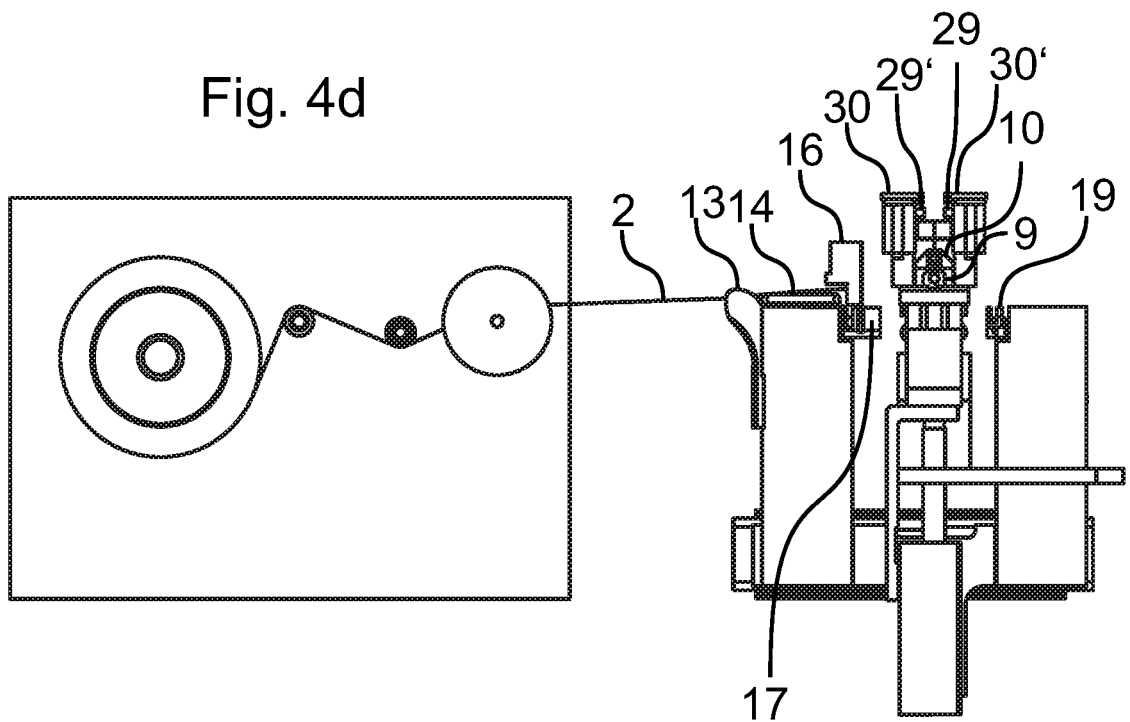

The upper main point 25 is located immediately above the second cable. In the predetermined position, the parallel gripper jaws 29, 29' are closed again and the adhesive tape 2 is compressed in the third contact region 28" and adheres together or to itself. Subsequently, the parallel gripper jaws 29, 29' are guided in the closed state downwards in the direction of the second cable. The distance can be approx. 0.5 mm here. The position after completion of this movement sequence with opened parallel gripper jaws 29, 29' is shown in FIG. 4d.

The first main point 23 and the third main point 25 are each approached with the lower edge of the parallel gripper jaws 29, 29'. By contrast, the second main point 24, which is located directly below the second cable, is approached with the upper edge of the parallel gripper jaws 29, 29'.

The parallel gripper jaws 29, 29' are selected in size so that the region between the first cable (lower cable in FIG. 4a-4f) and the second cable (upper cable in FIG. 4a-4f) can be firmly compressed, in particular since the first contact region 28 and the second contact region 28' overlap.

The height (in FIG. 5 extending from top to bottom or vice versa) of the two first contact regions 28, 28' between the two cables together is greater than the height of the third contact region 28" above the second cable. The three contact regions 28, 28', 28" can each have the same height.

An alternative embodiment provides that the movement sequence changes insofar as, after the first main point 23, first the third main point 25 and finally the second main point 24 are approached. The parallel gripper jaws 29, 29', after moving in the direction of the first cable in closed positions in order to compress the adhesive tape 2 in the first contact region 28, are now opened so that the adhesive tape applicator head 22 approaches or can approach the upper, third main point 25. The upper main point 25 is located immediately above the second cable. Now the parallel gripper jaws 29, 29' are closed again and the adhesive tape 2 is compressed in the third contact region 28" and adheres to itself. The adhesive tape 2 or the adhesive tape shuttle 20 is thus fixed in a third contact region 28". In the closed position of the parallel gripper jaws 29, 29', these travel a distance (e.g., about 0.5 mm) downwards in the direction of the second cable.

Now the second main point 24 is approached. After moving the parallel gripper jaws 29, 29' to the second main point 24, they are closed and the adhesive tape 2 thereby compressed in a second contact region 28'. Subsequently, the parallel gripper jaws 29, 29' are guided in the closed state upward in the direction of the second cable. The distance can be approx. 0.5 mm here.

By moving the parallel gripper jaws 29, 29' first to the third main point 25 before moving them to the second main point 24, the contact between the adhesive tape shuttle 20 and the second cable is ensured earlier in the process, which is advantageous for process critical cables.

Figure 4E:
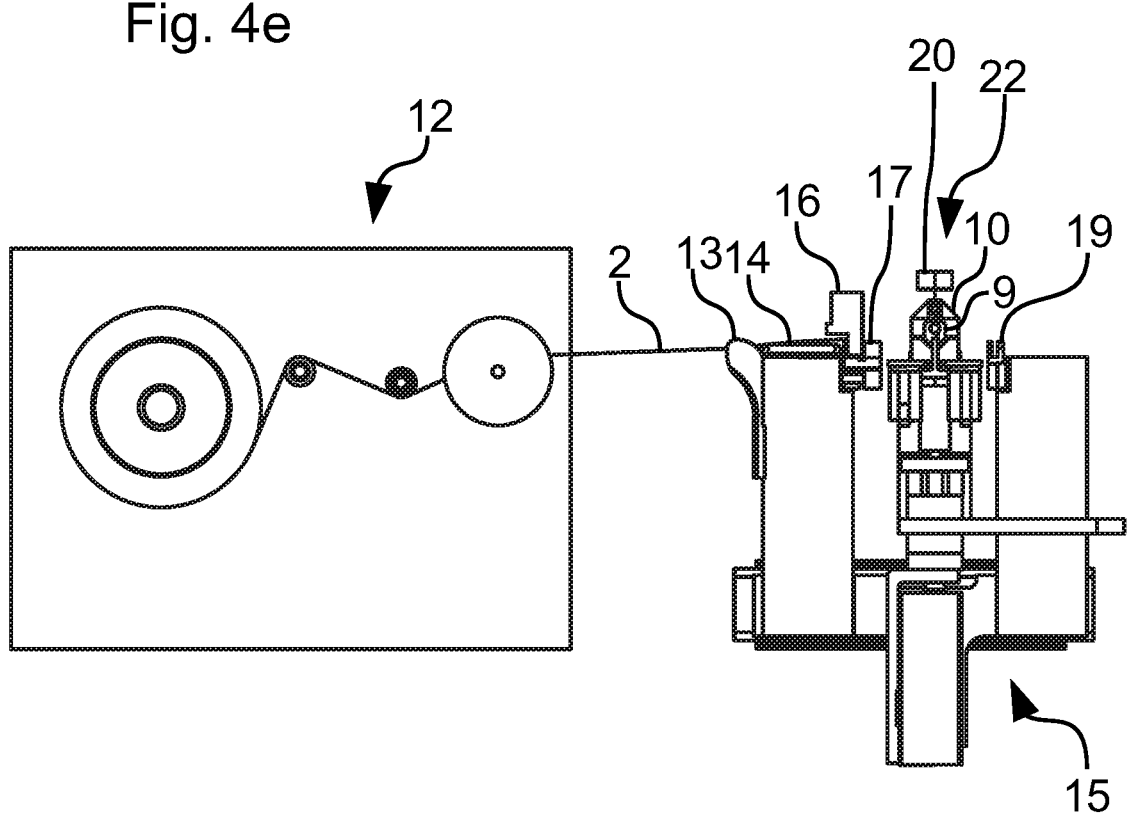
Figure 4F:
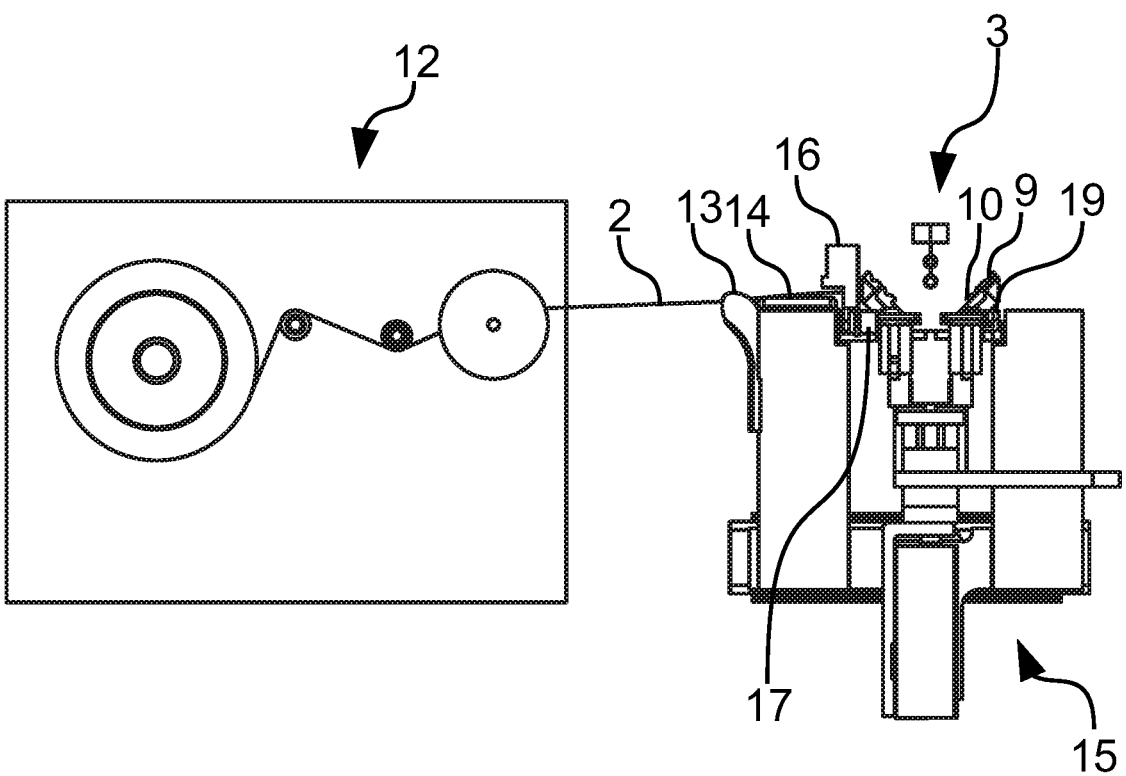

After bonding the adhesive tape 2 in the three contact regions 28, 28', 28", the adhesive tape applicator head 22 moves down again. The position after this movement downward is shown in FIG. 4e. The double cable grippers 9, 10 continue to hold the two end regions 4, 4' of the cables. Finally, the double cable grippers 9, 10 open and release the finished cable assembly 3. This is shown in FIG. 4f.

The cable arrangement 3 comprises the first cable and the second cable. A free end region of the first cable is connected to a first end region of the second cable. The cables are parallel and aligned offset from one another along their longitudinal direction (which extends in the direction of the linking direction 6). Further cables can be connected to the second end region of the second cable, so that a cable chain is formed. The cable chain can be rolled up on a drum.

The cables overlap in an overlapping region 11 along the longitudinal direction of the cables or the linking direction 6, e.g., about 100 mm. The cables are arranged offset to one another along a longitudinal direction of the first cable or of the second cable. The overlapping region 11 is at most about 30%, in particular at most about 20%, of the length of the first cable or the second cable. Usually, the lengths of the first cable and the second cable are the same size. The overlapping region 11 is at least about 5% or at least about 8%, in particular at most 10%, preferably at most 15%, of the length of the first cable or of the second cable. The overlapping region 11 may be in a range of about 5%-30%, in particular about 10% to about 20%, preferably in a range of about 15% to about 20%, the length of the first cable or the second cables. The plurality of cables are connected to each other in series or in steps.

The second end region of the second cable can now take over the function of the free end region of the first cable in a new step of the cable connection.

The guide trough 14 has a guide notch. The guide notch allows user-friendly threading of the adhesive tape strip into the cable connection device 1. In this case, the adhesive tape strip is peeled off from the adhesive tape roll of the feeding device 12 and the first adhesive tape end is folded by hand into an opening tab 5, 5' along the longitudinal direction of the adhesive tape 2. This opening tab 5, 5' is positioned projecting in the guide notch of the guide trough 14. The folding gripper 17 can thus receive the adhesive tape 2. The adhesive tape applicator 15 then moves from the pickup position to the applicator position. Here, the manually shaped opening tab 5, 5' is detected by the cutting gripper 16. The cable connection device 1 is thus set up ready for operation.

The parallel gripper jaws 29, 29' can have an elastomer layer for increasing the friction, which can have lamellae transverse to the movement direction along the adhesive tape 2.

Figure 5:
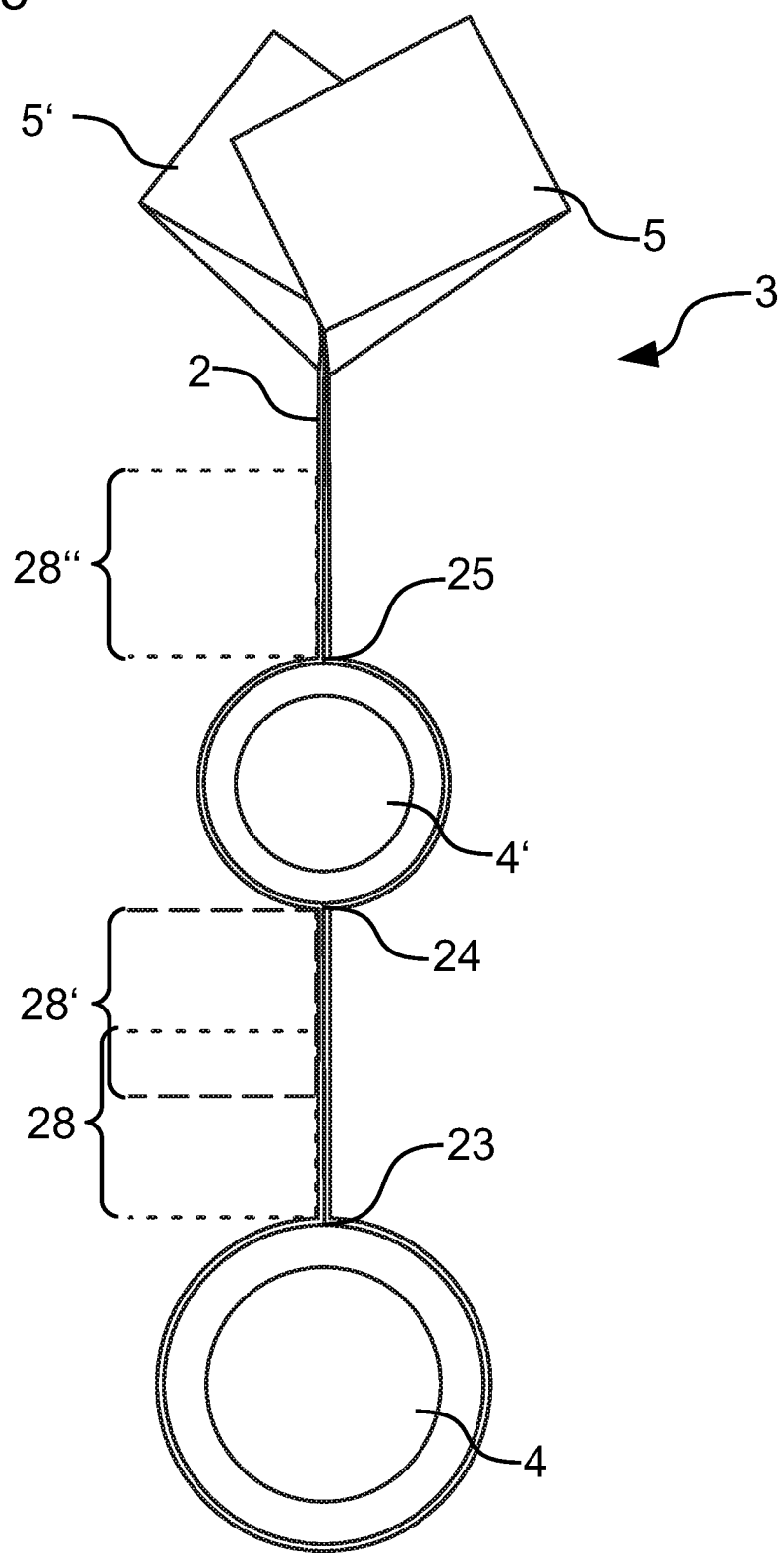
FIG. 5 shows a side view of the cable arrangement of FIG. 2.
Figure 6:
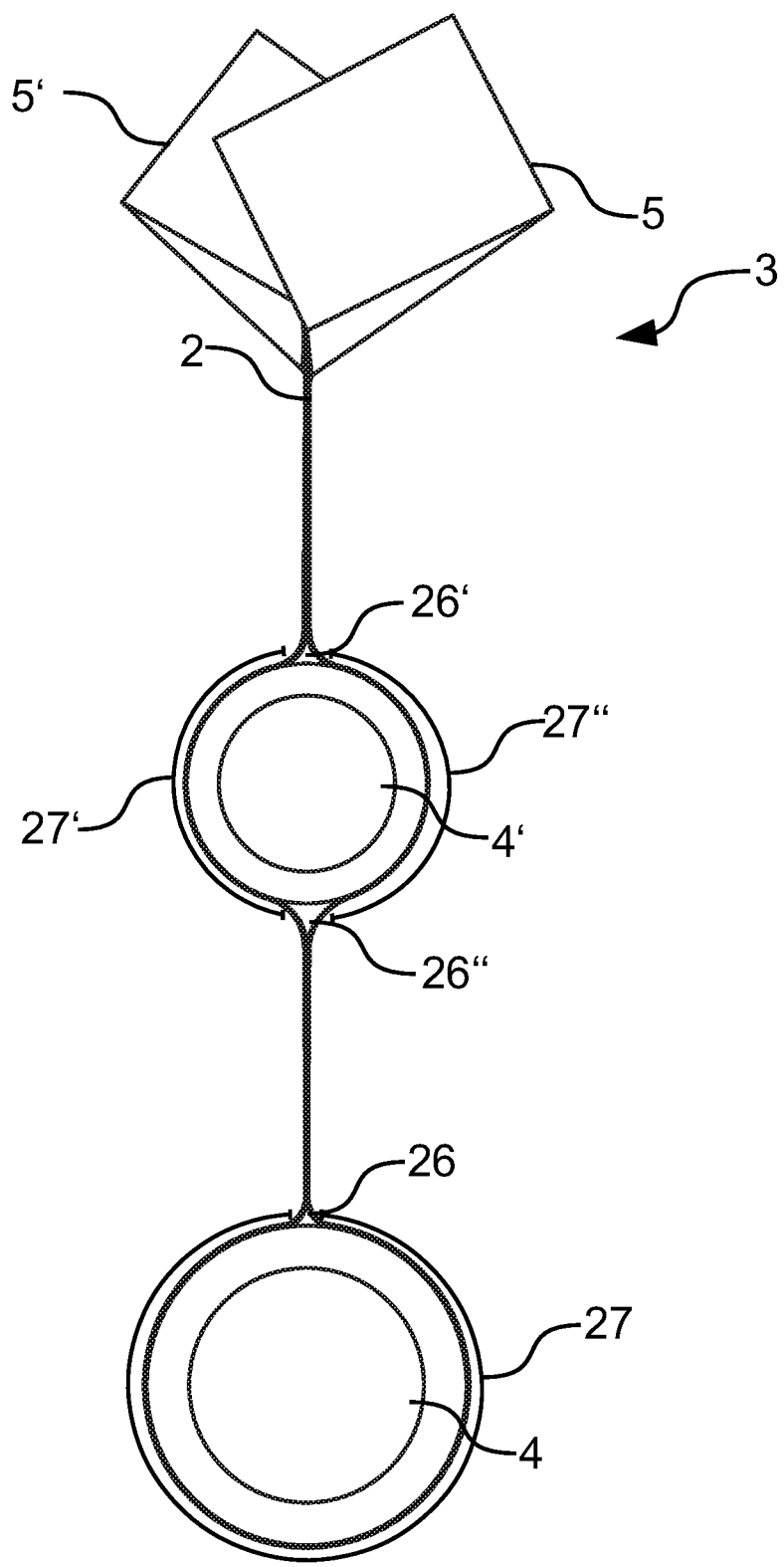
FIG. 6 shows a further side view of the cable arrangement of FIG. 2 or FIG. 5.

FIG. 5 shows a side view of the cable arrangement 3 of FIG. 1a or 1b. FIG. 6 shows a further side view of the cable arrangement 3 from FIG. 1a, 1b or 5. In FIG. 5 are the three contact regions 28, 28', 28" in which the parallel gripper jaws 29, 29' have compressed the adhesive tape 2. The adhesive tape 2 is arranged substantially symmetrically (except for the opening tabs 5, 5') with respect to a plane of symmetry which extends in FIGS. 5 and 6 from top to bottom through the middle of the cables. The cable arrangement 3 may include further cables (not shown). The cables, e.g., ten, twenty or more cables, are arranged in series and each have a region overlapping with each other (the possible sizes of the overlapping region are given in the preceding description). The overlapping regions of the plurality of cables can each be the same size. The cables are connected to each other in pairs. This means that each cable is connected to exactly two cables (with the exception of the first and the last cable in the series, which are each connected with exactly one cable).

The three wrap-around regions 27, 27', 27" can be seen in FIG. 6, i.e., the regions in which there is a contact between the respective cable and the adhesive tape 2. In the first wrap-around region 27, an uninterrupted part of the adhesive tape 2 extends almost completely around the circumference of the free end region 4 of the first cable. The adhesive tape almost makes a full circle here. Immediately above the first cable is a free region 26 in which the adhesive tape 2 is neither adhering to itself nor adhering to the first cable.

In the second wrap-around region 27' and the third wrap-around region 27", in each case an uninterrupted part of the adhesive tape 2 runs around nearly half of the circumference of the first end region 4' of the second cable. The adhesive tape 2 extends in the second wrap-around region 27' over almost 180° of the circumference of the first end region 4' of the second cable. The adhesive tape 2 extends in the third wrap-around region 27' over almost 180° of the circumference of the first end region 4' of the second cable.

In each case, a further free area 26', 26" is arranged immediately above and below the second cable. Again, the adhesive tape 2 is neither adhering to itself, nor is the adhesive tape 2 adhering to the cable.

Especially with cables having small diameter, the cable arrangement 3 or connection of the two cables is particularly stable when the free regions 26, 26', 26" are as small as possible. The adhesive tape can be substantially completely adhered to itself in the region between the two cables or the two end regions 4, 4', i.e., essentially no free regions 26, 26' exist.

Figure 7:
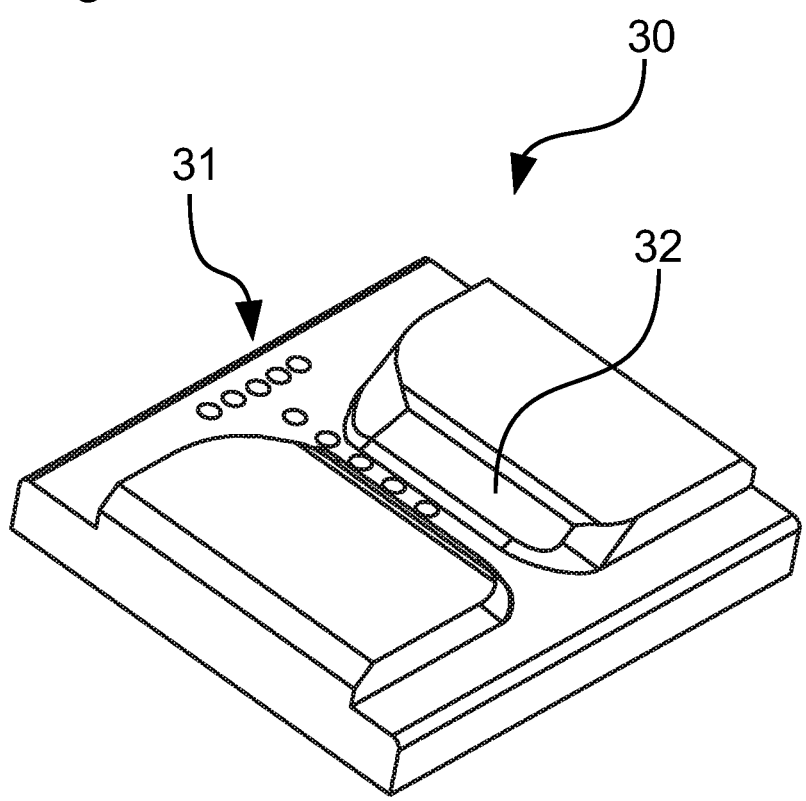
FIG. 7 shows a detailed view of an adhesive tape support of the adhesive tape applicator head of the cable connection device of FIG. 3 or of FIGS. 4a-4f.

FIG. 7 shows a detailed view of an adhesive tape support 30 (also 30' in FIG. 4d) of the adhesive tape applicator head 22 of the cable connection device 1 of FIG. 3 or of FIGS. 4a-4f. The adhesive tape support 30 has a vacuum device 31 for sucking the adhesive tape 2. As a result, the adhesive tape 2 can be held particularly securely on the adhesive tape applicator head 22. The adhesive tape 2 is located during the fastening in the holding contour 32, which is configured prism-shaped.

The strength of the connection of the first cable and the second cable or of the respective end regions 4, 4' of the cables results from the strength and the adhesive force of the adhesive tape 2 and from the wrap-around regions 27, 27', 27" of the two cables. The free region 26, 26', 26" is the triangular or prismatic region between the outer jacket of the respective cable and the self-adhering side of the adhesive tape 2 or the contact regions 28, 28', 28".

The adhesive tape 2 or the adhesive layer on one side of the adhesive tape 2 has such an adhesion force that the adhesive bond between the adhesive side of the adhesive tape 2 in the contact regions 28, 28', 28" can be readily detached by human force. By pulling the opening tabs 5, 5' from each other, the adhesive bond in the contact regions 28, 28', 28" can be released manually, in particular without tools. In particular, no residues remain on the cables after detaching the adhesive tape 2 from the cables. At the same time, the adhesive force is so great that unintentional release of the adhesive bond in the contact regions 28, 28', 28" does not normally occur. The adhesive tape 2 can be, for example, a commercially available painters tape, in particular a commercially available durable painters tape.

The adhesive tape 2 or the adhesion of the adhesive tape 2 in the contact regions 28, 28', 28" can be achieved by pulling the opening tabs 5, 5' from one another and finally the cables can also be detached from the adhesive tape 2, in particular without residue.

Finally, it should be noted that terms such as "having," "comprising," etc., do not exclude other elements or steps, and terms such as "a" or "an" do not exclude a plurality. It should also be pointed out that features or steps that were described with reference to any of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for connecting a first cable to a second cable with an adhesive tape comprising the following steps:
   arranging a free end region of the first cable parallel to and spaced from a first end region of the second cable wherein the free end region and the first end region point in opposite directions;
   providing the adhesive tape folded in a longitudinal direction of the adhesive tape forming opening tabs at a first adhesive tape end and an opposite second adhesive tape end such that an adhesively coated side of the adhesive tape partially adheres to itself; and
   enclosing a part of the free end region of the first cable and a part of the first end region of the second cable with the adhesive tape such that the free end region of the first cable is positioned a greater distance from the first adhesive tape end and the second adhesive tape end than is the first end region of the second cable and the free end region of the first cable is detachably connected to the first end region of the second cable by the adhesive tape.

2. The method according to claim 1 wherein the adhesively coated side of the adhesive tape is pressed together to form at least two contact regions including a first contact region formed between the free end region of the first cable and the first end region of the second cable and a further contact region is formed on a side of the first end region of the second cable facing the first adhesive tape end and the second adhesive tape end of the adhesive tape.

3. The method according to claim 2 including a second contact region formed between the free end region of the first cable and the first end region of the second cable, wherein the first contact region is closer to the free end region of the first cable than the second contact region, and wherein the further contact region is a third contact region.

4. The method according to claim 3 including providing an adhesive tape applicator head for pressing the adhesive tape together, and performing at least one of moving the applicator head in the first contact region in a direction of the first cable, moving the applicator head in the second contact region in a direction of the second cable, and moving the applicator head in the third contact region in a direction of the second cable.

5. The method according to claim 3 including first forming the first contact region, then forming the second contact region and finally forming the third contact region.

6. The method according to claim 3 including first forming the first contact region, then forming the third contact region and finally forming the second contact region.

7. The method according to claim 1 including connecting a second end region of the second cable opposite the first end region of the second cable by another adhesive tape to a first end region of a third cable to form a cable chain.

8. The method according to claim 1 including performing the arranging step by arranging the first cable offset to the second cable along a longitudinal direction of the first cable by at least 50% of a length of the first cable in the longitudinal direction.

9. A cable arrangement comprising:
   a free end region of a first cable;
   a first end region of a second cable aligned parallel to and spaced from the free end region of the first cable;
   an adhesive tape detachably connecting the free end region of the first cable to the first end region of the second cable wherein the free end region and the first end region point in opposite directions, wherein the adhesive tape is folded at a first adhesive tape end and an opposite second adhesive tape end in a longitudinal direction of the adhesive tape forming opening tabs and an adhesively coated side of the adhesive tape partially detachably adheres to itself.

10. The cable arrangement according to claim 9 wherein the adhesively coated side of the adhesive tape partially adheres to itself between the free end region of the first cable and the first end region of the second cable.

11. The cable arrangement according to claim 9 wherein the free end region of the first cable is arranged offset to the first end region of the second cable along a longitudinal direction of the first cable by at least 50% of a length of the first cable in the longitudinal direction.

12. A cable connection device for connecting a first cable to a second cable by an adhesive tape, wherein the cable connection device comprises:
   a cable holder for holding a free end region of the first cable spaced from and parallel to a first end region of the second cable with the free end region and the first end region pointing in opposite directions;
   an adhesive tape applicator including an adhesive tape applicator head, the adhesive tape applicator feeding the adhesive tape to the adhesive tape applicator head, wherein the adhesive tape is folded forming opening tabs at a first adhesive tape end and an opposite second adhesive tape end in a longitudinal direction of the adhesive tape such that an adhesively coated side of the adhesive tape partially adheres to itself; and wherein the adhesive tape applicator wraps at least a part of the free end region of the first cable and at least a part of the first end region of the second cable with the adhesive tape thereby forming at least one contact region arranged between the free end region of the first cable and the first end region of the second cable and in which at least one contact region the adhesively coated side of the adhesive tape adheres to itself.

13. The cable connection device according to claim 12 wherein the adhesive tape applicator includes two parallel gripper jaws for compressing the adhesive tape in the at least one contact region.

14. The cable connection device according to claim 13 wherein the parallel gripper jaws each have a friction-increasing coating for preventing slippage of the adhesive tape.

15. The cable connection device according to claim 13 wherein the parallel gripper jaws have a friction-reducing layer to better slide over the adhesive tape.

16. The cable connection device according to claim 12 wherein the adhesive tape applicator is movable in the longitudinal direction of the adhesive tape.

17. The cable connection device according to claim 12 wherein the adhesive tape applicator includes a vacuum device for sucking at least one of the first adhesive tape end and the second adhesive tape end to the adhesive tape applicator head.

18. The cable connection device according to claim 12 including a folding gripper for gripping and folding each of the first adhesive tape end and the second adhesive tape end to form the opening tabs.

19. The cable connection device according to claim 12 including a cutting gripper for holding the adhesive tape and cutting the adhesive tape.

20. The cable connection device according to claim 12 wherein the cable holder holds the first cable and the second cable during the wrapping with the adhesive tape with the first cable arranged offset to the second cable along a longitudinal direction of the first cable by at least 50% of a length of the first cable in the longitudinal direction.

* * * * *